March 3, 1953
M. D. HARE
2,629,971
METHOD OF FORMING GLASS SEALS
BETWEEN TUBULAR MEMBERS
Filed Sept. 14, 1945
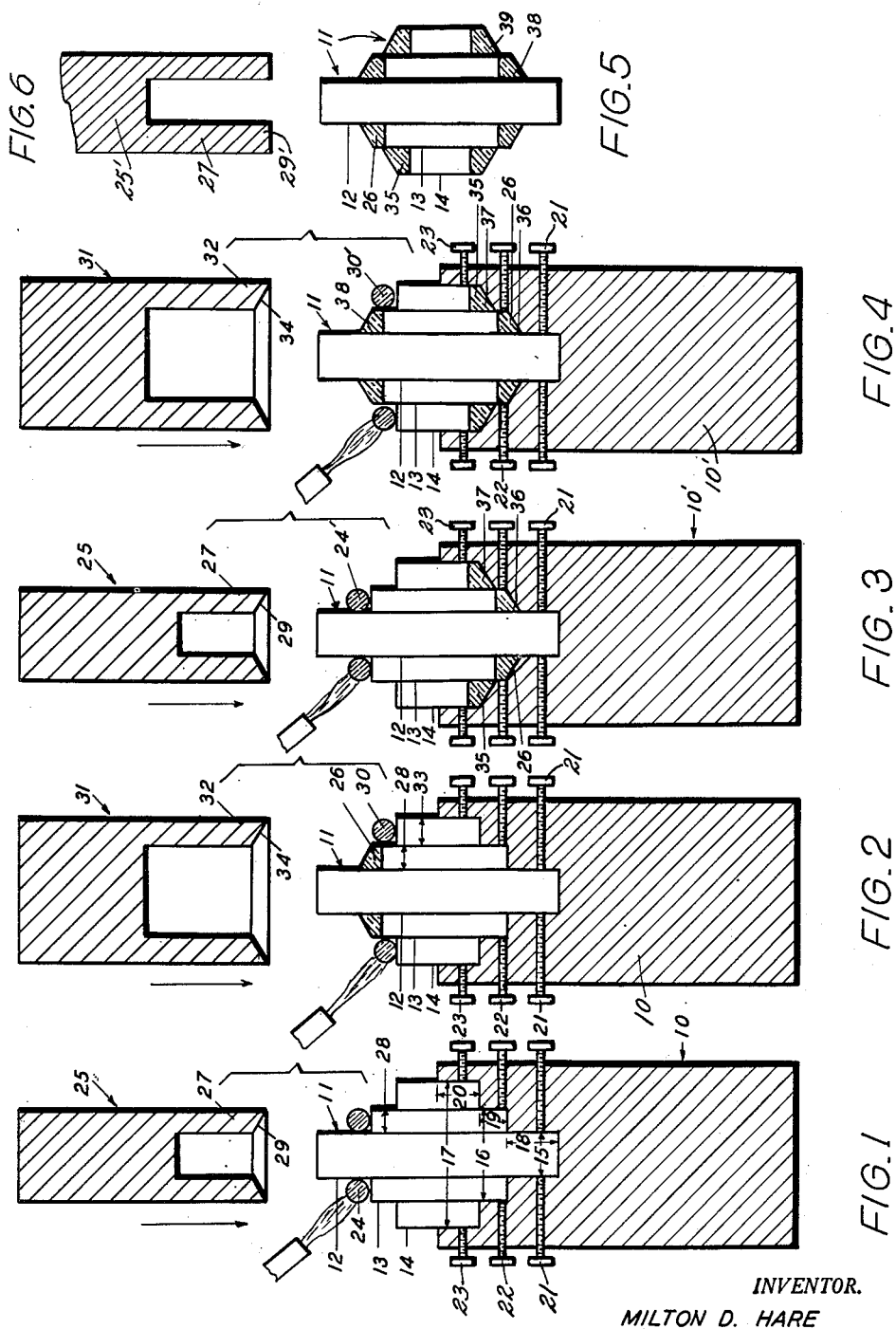
INVENTOR.
MILTON D. HARE
BY
William D. Hall
ATTORNEY Patented Mar. 3, 1953

2,629,971

UNITED STATES PATENT OFFICE 2,629,971

METHOD OF FORMING GLASS SEALS BETWEEN TUBULAR MEMBERS

Milton D. Hare, Cambridge, Mass., assignor to the United States of America as represented by the Secretary of War Application September 14, 1945, Serial No. 616,385

6 Claims. (Cl. 49—81)

This invention relates to a method of forming glass seals. More particularly it relates to a method of forming glass seals between a plurality of metallic members adapted to fit within each other where it is essential that they be accurately spaced, such as the cylindrical supporting structures of concentrically arranged vacuum tubes.

The methods used by the prior art to form glass seals of the last mentioned type involve several separate operations. These operations consume an excessive amount of time and require the use of expensive and complicated mechanisms to move the members into proper position and to hold them while the seals are being formed.

The general practice in forming such seals has been to place the first member into a jig or holder, to place a glass ring around the portion to be sealed and to apply heat until the glass flows and fuses with the member. The application of heat is continued while another jig is used to place the next member into the desired position. Both members are then subjected to continued heat until the glass flows and fuses to form a complete seal between them. This procedure is repeated for each additional member to be sealed.

Particularly in the case of vacuum tube elements and similar type articles, the holders and jigs must be of complicated design because the use of the ordinary mandrel type of jig is prohibited since the structural members themselves are of uneven shapes and contain fragile and critically spaced elements. It is an aim of the present invention to obviate the need for mandrel jigs and otherwise meet the problems involved as last mentioned.

Since it is often necessary that seals be formed between both ends of such members the procedure outlined above must be repeated while the application of heat is continued. During this procedure, unless precautions are taken to prevent it, the glass may soften at the end already sealed and cause a displacement or misalignment between the members. My invention is especially desirable for forming seals at both ends of a tube assembly, while overcoming the objections last mentioned.

It is an object of the present invention to provide a method of forming glass seals between a plurality of metallic members with a minimum number of operations.

It is also an object of the present invention to provide a method of forming glass seals of uniform and definite thickness and of uniform strength between a plurality of metallic members.

It is a further object of the present invention to provide a method of forming glass seals between a plurality of metallic members wherein the sealing process is accomplished in a minimum period of time.

Generally this invention includes a holder adapted to position the metallic members between which glass seals are to be made and a press having portions adapted to press the molten glass between the metallic members.

Other objects, features, and advantages of this invention will suggest themselves to those skilled in the art and will become apparent from the following description of the invention taken in connection with the accompanying drawings in which:

Fig. 1 is a longitudinal sectional view of a device embodying the present invention with parts of a vacuum tube schematically represented in place ready to have its cylindrical members sealed;

Fig. 2 is a similar view after one step of the sealing process has been completed;

Fig. 3 is a similar view after another step of the sealing process has been completed;

Fig. 4 is a similar sectional view before the last step of the sealing process has been completed; and Fig. 5 is a longitudinal sectional view of a vacuum tube structure after the sealing process has been completed at both of its ends.

Fig. 6 is a view similar to Fig. 1, with a modification of the work-engaging face of the former.

Referring now more particularly to Figs. 1 and 2, a holder 10, made of carbon or other good heat resisting material, is made of cylindrical or other convenient shape, has its internal shaping dependent upon the shape and spacing of the structural members that are to be glass sealed. In the present description these are intended to represent only extremities of structural members of a vacuum tube 11 to be joined. The structure of tube 11 includes three cylindrical metallic members 12, 13, and 14 which it is desired to seal together. In the example shown, these members are made of unequal lengths and are concentrically arranged with those of shorter length being progressively outside the longer ones. Holder 10 is step-bored with successive diameters or otherwise step-shaped internally to fit the ends of members 12, 13, and 14 and hold them in their desired relative positions. Thus, the deepest bore in holder 10 is of a diameter 15 to fit snugly around member 12, and the bore end will engage the end of the member 12. The diameter 16 of the next deepest bore is such as to hold and snugly fit around member 13, its termination affording a step support for the end of member 13; and the diameter 17 of the largest bore will hold and snugly fit around member 14, its termination forming a step support for the member 14. The difference in depth 18 between the deepest bore and the next is of proper length to provide the desired longitudinal spacing between the ends of members 12 and 13 and the difference of depth 19 between the next bore and the largest one is of proper length to space longitudinally the ends of members 13 and 14, as desired. The depth 20 of the outermost bore is sufficient to hold the structural members in their desired positions. Set screws 21, 22, and 23 in walls of holder 10 are tightened to hold members 12, 13, and 14 respectively in their proper positions and to keep them aligned. It may be seen in the drawings that, in the present instance, the members 12, 13, 14 are so proportioned that with their lower ends held in successively extended relation from the outermost one to the innermost, their upwardly presented opposite ends are also positioned in similar stepped relation, but in inverted order, the terminations ascending from the outermost one to the innermost one. This permits completion of sealing of tubular members by simple duplicate operations, as will appear.

Members 12, 13, and 14 are thus firmly held in fixed mutual relation at their lower ends in holder 10 and a glass ring 24 is then fitted at the other end of member 13, lying closely around the inner member 12 and resting by gravity on the member 13. This ring is then heated until it becomes molten. It will be noted that the ring 24 in this position is exposed on all sides, for the most convenient direction of heat thereagainst by conventional means, and it is thus accessible at all its sides without the necessity for its rotation. Press 25 is now pressed down on ring 24 which is thereby pressed into place and shaped between members 12 and 13. Then the heat is removed and the glass is allowed to solidify forming a hardened glass seal 26 (Figs. 2 and 5) of uniform thickness and strength.

Press 25 is made of carbon or other suitable material. It is of cylindrical or other convenient shape. It is hollowed out to form an annular portion 27 having an internal diameter slightly larger than that of member 12 and a thickness slightly less than the distance 28 (Fig. 2) between the members 12 and 13. The parts of the tube are represented simply by block forms without intending to indicate any particular vacuum tube structure at its intermediate portions along the axis of the tube, but are intended to represent approximately the opposite extremities of a tube constructed so as to permit the practice of my invention in one embodiment. The axial length of the assembly in relation to its diameter, as shown, may be unrelated to actual proportions of tubes in which the invention is employed, the material shown being only sufficient for convenience in illustrating the extremities of the parts in their proper relation to each other. This enables portion 27 to press the glass between the members 12 and 13. The end 29 of portion 27 may be perpendicular to the walls of portion 27 as at 29' (see Figure 6) or it may be shaped in any desired fashion to determine the shape of the glass seal that is made. For example in Fig. 1, this extremity is shaped as a conical annular end face, to produce a glass seal 26 (Fig. 2) having a small portion extending upwardly a distance beyond the end of member 13 with a frusto-conical termination.

The seal between members 13 and 14 is made in the same manner. Referring to Fig. 2, a glass ring 30 is placed at the end of member 14, heat is applied to melt the glass into a molten mass and press 31 is used to push it into the desired form and position between members 13 and 14. Press 31 is constructed similarly to press 25 and has an annular portion 32 slightly less thick than the radial distance 33 over member 14, and an inner diameter slightly greater than the external diameter of member 13. As in press 25, the extremity 34 of portion 32 is formed to produce the shape seal 35 (Figs. 3 and 5) desired. Press 31 is withdrawn and the glass is allowed to solidify forming a glass seal 35 (Figs. 3 and 5).

It will be appreciated that as the concave conical faces 29 and 34, are pressed against the molten glass they will limit outward flow of the molten glass as the latter is engaged, confining the glass peripherally to a large extent and causing it to press inwardly against the side of the inner member 12 or 13 as the case may be, as well as pressing the glass forcibly against the end face on which the solid glass ring was initially set. Also, the bores in press members 25 and 31 will fit snugly around the inner tube element 12 and the one 13 respectively, so that as the molten glass is compressed, it will not be permitted to extrude upwardly around the members 12 and 13 to form burrs and so interfere with setting of the sealed assembly end in the holder 10 or 10' as the case may be.

After the hardening of the seals 26 and 35, the partially formed tube (with the three parts 12, 13 and 14 now secured permanently together) is withdrawn from holder 10 and secured at the other end, that is, the end of the assembly at which the seals have already been formed, is now inserted in another holder 10' as shown in Fig. 3. Holder 10' is similar to holder 10 in all respects except in the formation of the step portions 36 and 37 which, instead of being flat as in holder 10, are shaped to fit seals 26 and 35 already formed. However, as there is no need for exact conformity of the holder to the seal step faces, the first sealed end of the inverted assembly can be supported in the holder 10, if desired, the central member 12 in such case not reaching to the bottom of the innermost bore, without detrimental effect. Heat is applied to a glass ring 24' placed at the end of member 13 and the molten glass is pressed into the desired position by the press 25 forming seal 38 (Figs. 4 and 5). Similarly press 31 is used to form a seal 39 (Fig. 5) between members 13 and 14 out of a glass ring 30' after the latter has been heated to moldable condition as stated; see Fig. 4.

While a device embodying the present invention and its uses has been described as applied to the sealing of the concentric structural members of a vacuum tube, it is to be understood that it is useful to form seals between any desired number of structures of many different shapes and sizes.

Thus the metallic members to be sealed need not be circular in cross-section but may be oval, square, triangular, or any other enclosed shape and they need not be exactly concentric but, as long as they fit one within the other in the step relation indicated, may be eccentrically arranged. To construct a device embodying the principles of this invention for assembling a metallic glass sealed structure all that is necessary is to design the holders 10 and 10' to have the proper internal dimensions to hold the elements in the desired positions and to design the presses 25 and 31 to have their annular portions 27 and 32 of proper dimensions to shape the desired seals.

From the above description, it is clear that by elimination of the movement of the elements to be sealed after the sealing process has been started and that by the accurate positioning of the molten glass by pressure means, the overall time that heat must be applied to complete several seals has been greatly shortened over the practice of the prior art. The elimination of movement of the members to be sealed after the process is partially completed and the positive and rigid holding of those elements in their correct positions during the whole process has eliminated the many troubles, such as parts becoming misaligned or displaced, encountered in the prior art. Practical application of the device and method herein described has demonstrated that the seals so produced are a marked improvement over those produced by the prior art and that great economy of time is effected.

While there has been here described what is at present considered to be the preferred embodiment of the invention, it will be obvious to those skilled in the art that various changes and modifications may be made therein without departing from the scope of the invention.

What is claimed is:

1. A method of forming a glass seal between two tubular metal envelope wall members in an electron tube and the like, which comprises the steps of fixedly positioning said members with tubular ends of different diameters on a vertical axis with the member of lesser diameter extending in close relation through and protruding exteriorly beyond the member of greater diameter, forming a terminal seal-supporting end face on the extremity of the last named wall member, placing a glass ring on said face of the extremity of the last named wall member beside and closely around the protrudent portion of the wall member of lesser diameter, applying melting heat to said ring from laterally without the ring, applying pressure to the molten ring in a direction along the axis of the said members toward the member of greater diameter and limiting the outward lateral flow of the molten glass simultaneously so as to cause it to press inwardly against the lateral outer surfaces of the protrudent end portion of the smaller diameter wall member and axially against the end face of the greater diameter wall member so as to effectively adhere to both said members.

2. The method of claim 1 wherein said application of pressure includes components of force acting inwardly from the exterior toward the interior of the ring.

3. A method of forming glass seals in electron tubes and the like between a plurality of metallic envelope tubular members of different diameters and lengths, the lengths of the tubular members being successively greater as their diameter is less and positioned one within another, comprising holding said tubular members rigidly to constitute a tube assembly on a vertical axis by fixedly supporting each said tubular member of the assembly at its lower part with ends of said tubular members presented upwardly in stepped relation ascending from the outermost to the innermost of said tubular member ends and with the lower ends of said tubular members arranged in stepped relation descending from the outermost one to the innermost one, placing a glass ring around each protrudent upper end portion of the inner of said tubular members and with said ring resting upon the end face of the extremity of the next outer tubular member, applying melting heat to each said ring directly from without to melt the whole of each said ring, pressing each molten ring throughout its extent around the assembly axis inwardly toward and against the lateral surface of the next adjacent protrudent end portion of the tubular member surrounded by the ring and axially upon the said end face upon which the ring rests, so as to join mutually adjacent tubular member ends and seal and permanently unite a first end of the tube assembly, inverting said assembly and supporting the same at the first end of the assembly so that the opposite ends of the tubular members, constituting a second end of the assembly are presented upwardly in stepped relation similar to the described relation of the tubular member ends in said first end of the assembly, and repeating on the second end of the assembly the placing of glass rings, melting thereof, and pressing thereof as first described.

4. The method of claim 3 including forming the tube assembly with identical opposite ends, setting the lower end of the assembly in a fitted support so that each tubular member has its end respectively supported and held fixedly in a step of said support with the tubular member ends successively longer from the outermost to the innermost one, uniting and sealing the upper tube ends of said tubular members together as aforesaid, then inverting the assembly, inserting the united ends of the assembly in said fitted support and repeating the steps applied to the first mentioned upper ends of the assembly on the newly elevated ends of the assembly to unite and seal the same.

5. The method of uniting one within another an assembly of a plurality of metal envelopes by glass seals, comprising the steps of arranging the envelopes one within another around a central one with parts respectively and successively longer from the outer one to the inner one, positioning the ends of the envelopes at a first end of the said assembly so that the end of an outer envelope lies in close surrounding relation to a protrudent end portion of a next inner envelope and short of the extremity of the latter, supporting said envelopes respectively and mutually fixed in the arrangement named with said first end of the assembly presented upwardly around a vertical axis and with ends of the envelopes at a second end of the assembly in a predetermined mutual relation, placing a glass ring on the terminus of each shorter envelope end at said first end of the assembly closely around the next adjacent protrudent envelope end portion, applying melting heat to each glass ring so placed, pressing each molten glass ring against its supporting envelope terminus and against the outer surface of the protrudent envelope portion next therewithin, so that the molten glass adheres to the two envelope parts and seals and unites them, and allowing the glass to set so that the whole assembly is secured together permanently at said first end.

6. The method of claim 5 including confining the molten glass ring within the longitudinal projection of the subjacent supporting terminus upon which it is laid, during said pressing of the molten glass ring.

MILTON D. HARE.

REFERENCES CITED

The following references are of record in the file of this patent:

UNITED STATES PATENTS

| Number | Name | Date |
|---|---|---|
| 1,680,738 | Hull | Aug. 14, 1928 |
| 2,290,050 | Hinkley et al. | July 14, 1942 |
| 2,292,863 | Beggs | Aug. 11, 1942 |
| 2,313,025 | Scharfnagel | Mar. 2, 1943 |
| 2,315,292 | Richardson et al. | Mar. 30, 1943 |
| 2,374,269 | Breadner et al. | Apr. 24, 1945 |
| 2,509,906 | Clark et al. | May 30, 1950 |
| 2,511,914 | Haas | June 20, 1950 |